(12) United States Patent
Oyama

(10) Patent No.: US 10,009,489 B2
(45) Date of Patent: Jun. 26, 2018

(54) DISPLAY AND INPUT DEVICE THAT RECEIVES IMAGE FORMING INSTRUCTION THROUGH TOUCH PANEL

(71) Applicant: KYOCERA Document Solutions Inc., Osaka (JP)

(72) Inventor: Kuniaki Oyama, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days. days.

(21) Appl. No.: 15/626,342

(22) Filed: Jun. 19, 2017

(65) Prior Publication Data
US 2018/0007219 A1 Jan. 4, 2018

(30) Foreign Application Priority Data
Jun. 29, 2016 (JP) ................................. 2016-129430

(51) Int. Cl.
*G06F 3/12* (2006.01)
*H04N 1/00* (2006.01)
*G06F 3/0488* (2013.01)

(52) U.S. Cl.
CPC ..... *H04N 1/00411* (2013.01); *G06F 3/04883* (2013.01); *G06F 3/1222* (2013.01); *G06F 3/1236* (2013.01); *G06F 3/1238* (2013.01); *G06F 3/1292* (2013.01); *H04N 1/00307* (2013.01); *H04N 1/00413* (2013.01); *H04N 1/00482* (2013.01); *H04N 1/00493* (2013.01); *G06F 2203/04808* (2013.01); *H04N 2201/0055* (2013.01); *H04N 2201/0075* (2013.01); *H04N 2201/0082* (2013.01)

(58) Field of Classification Search
None
See application file for complete search history.

(56) References Cited

U.S. PATENT DOCUMENTS

2009/0103124 A1* 4/2009 Kimura ................. G06F 3/1204
358/1.15
2010/0134826 A1* 6/2010 Ishigure ............... H04N 1/0035
358/1.15

(Continued)

FOREIGN PATENT DOCUMENTS

JP 2011-096102 A 5/2011

*Primary Examiner* — Moustapha Diaby
(74) *Attorney, Agent, or Firm* — IP Business Solutions, LLC

(57) ABSTRACT

A display and input device includes a display unit, a touch panel, an operation reception unit, a display controller, an instruction generation unit, a communication unit, and a communication controller. The communication controller transmits an instruction to provide setting information including a list of items to be set related to image forming and default set values of the items to be set, to an image forming apparatus identified by the instruction generation unit. The display controller displays a setting screen for inputting a change of the set value from the default value, with respect to the items to be set indicated by the setting information received from the image forming apparatus. The instruction generation unit determines the set value of the item to be set according to a user's operation, and generates an image forming instruction based on the determined set value of the item to be set.

2 Claims, 11 Drawing Sheets

(56) References Cited

U.S. PATENT DOCUMENTS

| | | | |
|---|---|---|---|
| 2013/0208312 A1* | 8/2013 | Morita | G06F 3/04883 358/1.15 |
| 2013/0229690 A1* | 9/2013 | Sumita | H04N 1/00127 358/1.15 |
| 2015/0077772 A1* | 3/2015 | Satou | G06F 3/1208 358/1.9 |
| 2015/0278660 A1* | 10/2015 | Yamamoto | G06F 3/12 358/1.2 |
| 2016/0173709 A1* | 6/2016 | Kouno | H04N 1/00244 358/1.15 |

* cited by examiner

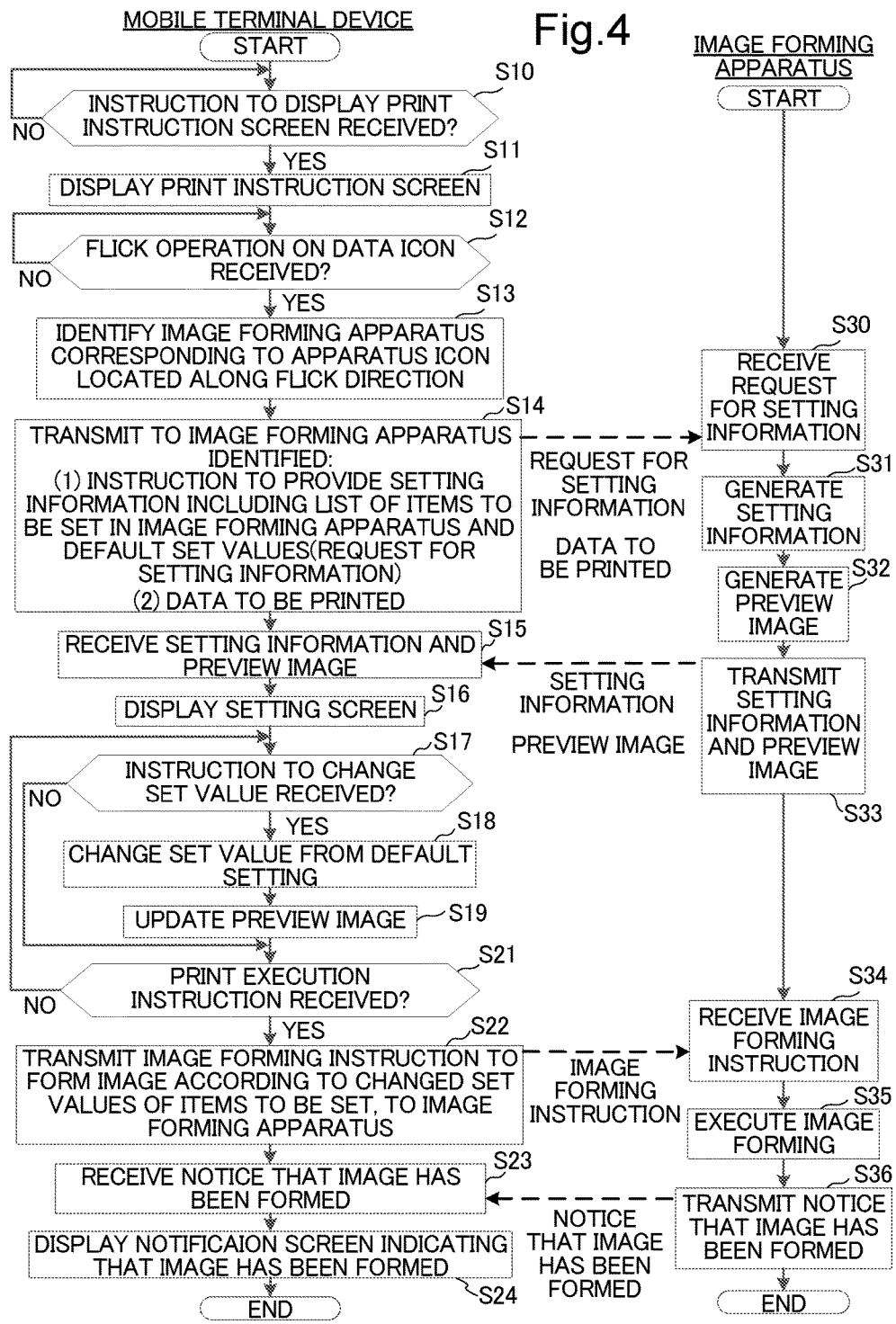

DISPLAY AND INPUT DEVICE THAT RECEIVES IMAGE FORMING INSTRUCTION THROUGH TOUCH PANEL

INCORPORATION BY REFERENCE

This application claims priority to Japanese Patent Application No. 2016-129430 filed on Jun. 29, 2016, the entire contents of which are incorporated by reference herein.

BACKGROUND

The present disclosure relates to a display and input device, and in particular to a display-based input technique for inputting an image forming instruction by a user's operation made on a touch panel.

In recent years, display and input devices that include a touch panel have come to be widely utilized. The display and input device is configured to accept a gesture operation such as flicking or touching, so that the user can cause the device to process various data by performing the gesture operation for inputting. In this relation, a technique is disclosed to transmit, for example when a flick operation is performed on an icon indicating certain data, the data to another display and input device designated by the flick operation. Such a technique allows the user to transmit the data to another display and input device, with an intuitive and simple operation.

SUMMARY

The disclosure proposes further improvement of the foregoing technique.

In an aspect, the disclosure provides a display and input device including a display unit, a touch panel, a communication unit, and a control unit.

The control unit includes a processor and, based on operation of the processor in accordance with a display and input control program, performs as a display controller, an operation reception unit, a communication controller, and an instruction generation unit.

The display controller controls a displaying operation performed by the display unit.

The touch panel is located on a front face of the display unit.

The operation reception unit receives a user's operation performed on the touch panel.

The communication unit is configured to transmit and receive data to and from a plurality of image forming apparatuses provided outside.

The communication controller controls a communicating operation performed by the communication unit.

The instruction generation unit generates an image forming instruction directed to the image forming apparatus, according to the user's operation received by the operation reception unit.

The instruction generation unit identifies data of an image to be formed, and one of the plurality of image forming apparatuses to be used for image forming based on the data of the image to be formed, according to the user's operation received by the operation reception unit.

The communication controller causes the communication unit to transmit, to the image forming apparatus identified by the instruction generation unit, an instruction to provide setting information including a list of items to be set related to an image forming operation that can be set in the image forming apparatus and default set values of the respective items to be set in the image forming apparatus.

The display controller causes the display unit, when the communication unit receives the setting information from the image forming apparatus, to display a setting screen for inputting a change of the set value from the default set value indicated in the setting information, with respect to the item to be set the setting information.

Further, the instruction generation unit determines the set value of the item to be set according to the user's operation received by the operation reception unit through the setting screen, and generates the image forming instruction to form the image based on the data of the image to be formed, according to the determined set value of the item to be set.

The communication controller causes the communication unit to transmit the image forming instruction generated by the instruction generation unit to the image forming apparatus.

BRIEF DESCRIPTION OF THE DRAWINGS

FIG. 4 is a flowchart showing an operation of the mobile terminal device and an image forming apparatus according to the embodiment of the disclosure.

DETAILED DESCRIPTION

Hereafter, a display and input device according to an embodiment of the disclosure will be described with reference to the drawings.

Figure 1:
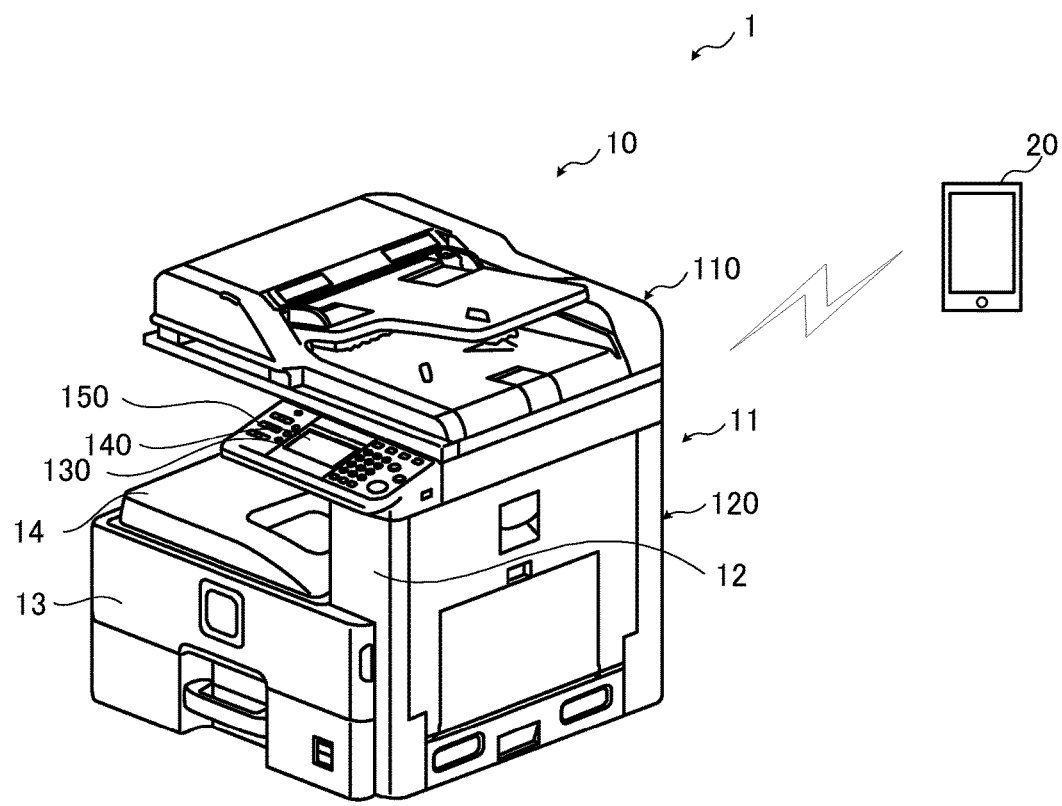
FIG. 1 is a perspective view showing a configuration of a display and input system according to an embodiment of the disclosure.
Figure 2:
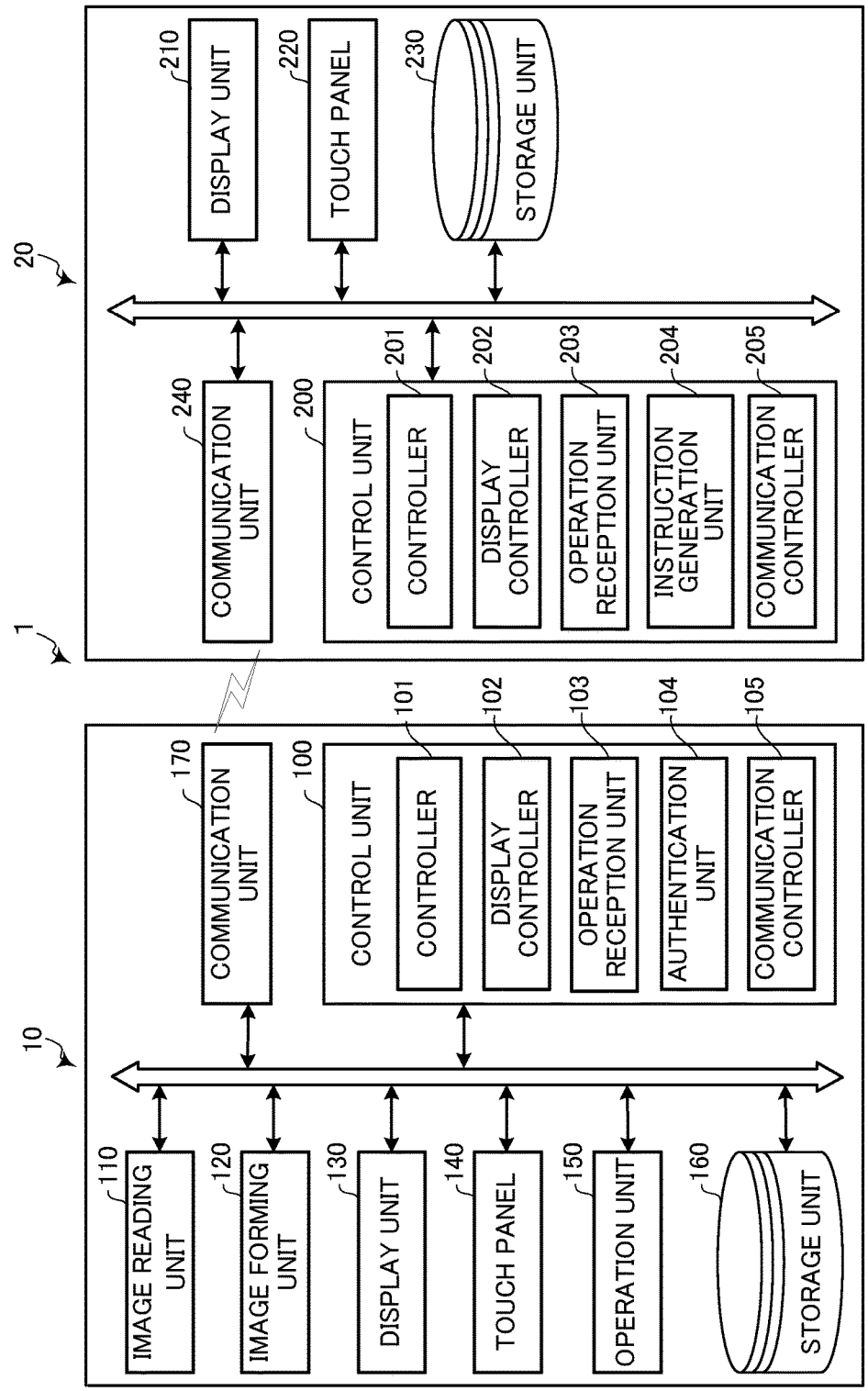
FIG. 2 is a block diagram showing an internal configuration of the display and input system according to the embodiment of the disclosure.

FIG. 1 is a perspective view showing a configuration of the display and input system according to the embodiment of the disclosure. FIG. 2 is a block diagram showing an internal configuration of the display and input system according to the embodiment of the disclosure.

The display and input system 1 includes a plurality of image forming apparatuses 10, and a mobile terminal device 20 capable of making communication with the plurality of image forming apparatus 10. The mobile terminal device 20 serves as a display and input device that generates an image forming instruction according to a user's operation performed on a touch panel 220, and transmits the generated image forming instruction to the image forming apparatus 10. First, the configuration of the image forming apparatus 10 will be described.

The image forming apparatus 10 is a multifunction peripheral configured to execute a plurality of functions such as copying, printing, scanning, and facsimile transmission/reception. The image forming apparatus 10 includes a main body 11 and an image reading unit 110 located on the upper side of the main body 11, and an intermediate unit 12 provided between the image reading unit 110 and the main body 11.

The main body 11 includes an image forming unit 120, a paper feed unit 13, and other components.

When the image forming apparatus 10 performs the image forming operation, the image forming unit 120 forms a toner image, for example based on an image read by the image reading unit 110, on a recording sheet delivered from the paper feed unit 13. Then the toner image formed on the recording sheet is thermally fixed by a non-illustrated fixing unit. The recording sheet having the image formed and fixed thereon is discharged to an output tray 14.

A display unit 130 and an operation unit 150 are provided on the front side of the casing constituting the outer shell of the image forming apparatus 10. The display unit 130 includes, for example, a liquid crystal display (LCD) or an organic light-emitting diode (OLED) display. The display unit 130 displays, for example, a setting screen for inputting the image forming instruction and settings related to the image forming, under the control of a display controller 102 to be subsequently described.

A touch panel 140 is located on the front face of the display unit 130. The touch panel 140, which may be of a resistive film type or an electrostatic capacitance type, detects a contact (touch) made by a user, as well as the position where the contact has been made, on the touch panel 140. Upon detecting a contact made by the user, the touch panel 140 outputs a detection signal indicating the coordinate position of the contact point, to an operation reception unit 103, to be subsequently described.

The operation unit 150 is constituted of hard keys including, for example, a menu key for calling up a menu, arrow keys for moving the focus of GUI constituting the menu, and an enter key for confirming the selection of the GUI constituting the menu.

The storage unit 160 is a large-capacity storage device such as a hard disk drive (HDD).

A communication unit 170 is a network interface, for example constituted of a communication module such as a wireless LAN board.

The image forming apparatus 10 also includes a control unit 100. The control unit 100 is constituted of a central processing unit (CPU) a random-access memory (RAM), and a read-only memory (ROM). The control unit 100 acts as a controller 101, the display controller 102, the operation reception unit 103, an authentication unit 104, and a communication controller 105, when the CPU executes a control program stored in the ROM or the storage unit 160. Here, the controller 101, the display controller 102, the operation reception unit 103, the authentication unit 104, and the communication controller 105 of the control unit 100 may each be constituted in the form of a hardware circuit, instead of being performed according to the control program.

The controller 101 serves to control the overall operation of the image forming apparatus 10.

The display controller 102 is configured to control the display operations performed by the display unit 130. On the setting screen displayed in the display unit 130, a plurality of items to be set, for inputting detailed settings related to the image forming, are displayed under the control of the display controller 102. Examples of the items to be set include the size of the recording sheet, image quality, page integration, and output tray selection.

The operation reception unit 103 is configured to receive the user's operation performed on the touch panel 140, according to a detection signal outputted therefrom. The operation reception unit 103 is also configured to receive the user's operation inputted through the operation unit 150 such as the hard keys.

The authentication unit 104 is configured to authenticate or reject the authentication of the mobile terminal device 20 in response to the authentication request transmitted therefrom, to thereby determine whether to allow the controller 101 to execute the image forming instruction transmitted from the mobile terminal device 20. Such a function enables exclusion of an image forming instruction transmitted from a mobile terminal device other than a specific one.

The communication controller 105 is configured to control the communication unit 170 so as to transmit and receive data to and from the mobile terminal device 20.

The configuration of the mobile terminal device 20 will now be described hereunder. The mobile terminal device 20 is a portable device such as smartphone, and includes a control unit 200, a display unit 210, the touch panel 220, a storage unit 230, and a communication unit 240.

The display unit 210 is constituted of, for example, an LCD or an OELD. The display unit 210 displays a print instruction screen and other types of screens, under the control of a display controller 202 to be subsequently described.

Figure 3:
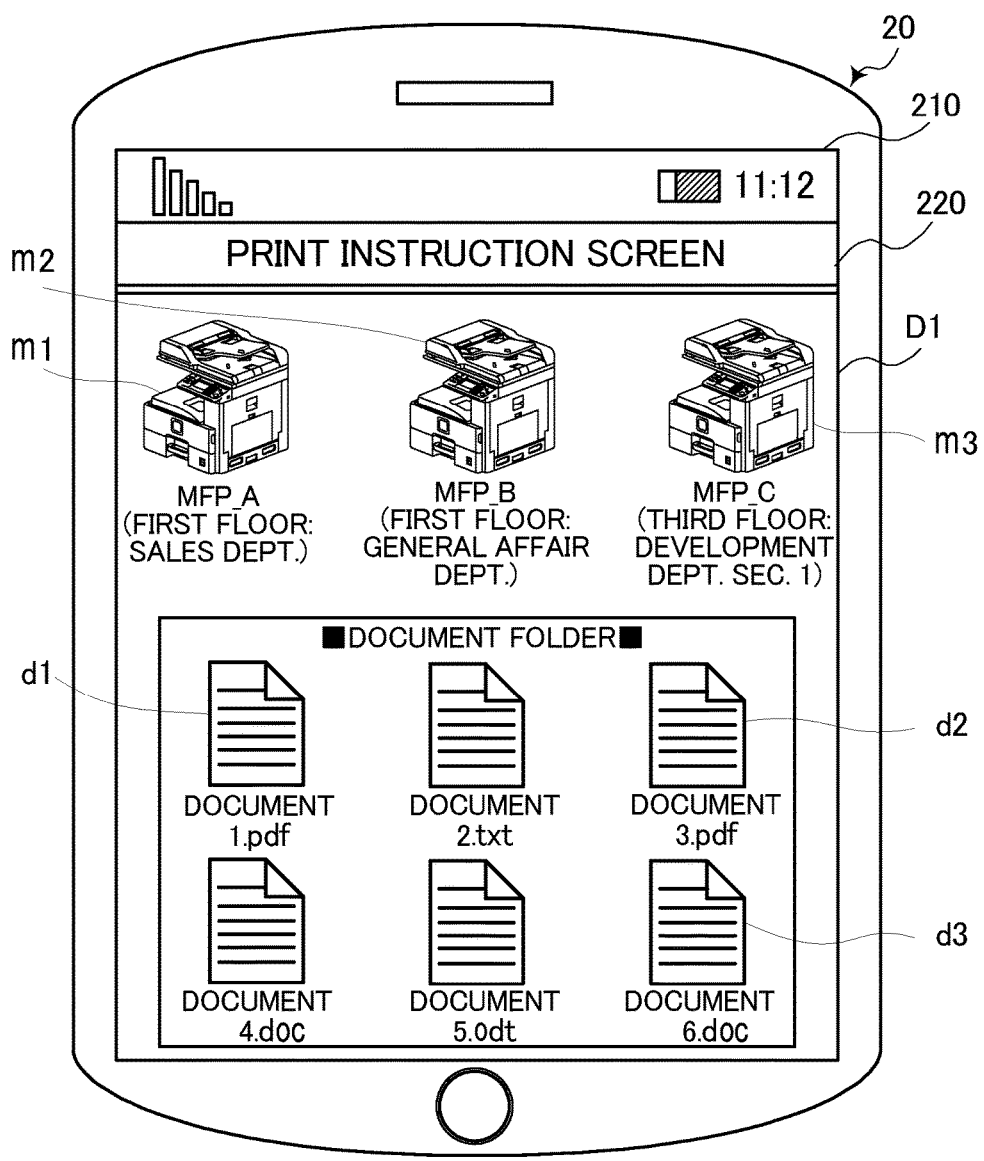
FIG. 3 is a schematic drawing showing an example of a print instruction screen displayed on a display unit of a mobile terminal device according to the embodiment of the disclosure.

FIG. 3 is a schematic drawing showing an example of the print instruction screen (reception screen) displayed FIG. 3, a plurality of data icons d1, d2, and d3, representing data stored in the mobile terminal device 20, and data stored in another electronic device connected to the mobile terminal device 20 or in a network, are arranged. The data icons d1, d2, and d3 represent files such as document files, corresponding to the data of the image to be formed by the image forming apparatus 10. An instruction generation unit 204 to be subsequently described generates the image forming instruction directed to the image forming apparatus 10, according to a flick operation performed on the data icons d1, d2, and d3.

The print instruction screen D1 also includes a plurality of apparatus icons m1, m2, and m3 representing the plurality of image forming apparatuses 10 that can transmit and receive data to and from the mobile terminal device 20. The apparatus icons m1, m2, and m3 each indicate the name of the image forming apparatus and the location where the image forming apparatus is installed. The instruction generation unit 204 identifies the image forming apparatus represented by the apparatus icon located along the direction of the flick operation performed on the data icons d1, d2, and d3, as the image forming apparatus to be used for the image forming based on the data of the image to be formed. The print instruction screen D1 may be set such that only the apparatus icons representing the image forming apparatus 10 successfully authenticated by the authentication unit 104 are displayed, out of the plurality of image forming apparatuses 10 that can be connected to the mobile terminal device 20, and that the apparatus icons representing the image forming apparatus 10 that has failed to acquire the authentication of the authentication unit 104 are not displayed.

The touch panel 220 is located on the front face of the display unit 210, and outputs, upon detecting a touch of the user, a detection signal indicating the coordinate position of the touched point, to an operation reception unit 203 to be subsequently described.

The storage unit 230 is a large-capacity storage device such as a HDD.

The communication unit 240 is a network interface, for example constituted of a communication module such as a wireless LAN board.

The control unit 200 includes a processor, a RAM, and a ROM. The processor is, for example, a CPU (Central Processing Unit), an ASIC (Application Specific Integrated Circuit), or an MPU (Micro Processing Unit). The control unit 200 acts as a controller 201, the display controller 202, the operation reception unit 203, the authentication unit 204, and a communication controller 205, when the processor executes a display and input control program stored in the ROM or the storage unit 230. Here, the controller 201, the display controller 202, the operation reception unit 203, the instruction generation unit 204, and the communication controller 205 of the control unit 200 may each be constituted in the form of a hardware circuit, instead of being performed according to the display and input control program.

The controller 201 serves to control the overall operation of the mobile terminal device 20. The controller 201 is connected to the display unit 210, the touch panel 220, the storage unit 230, and the communication unit 240. The controller 201 controls the operation of the cited components connected thereto, and transmits and receives signals or data to and from the cited components.

The display controller 202 is configured to control displaying operations performed by the display unit 210.

The operation reception unit 203 serves to receive a user's operation made on the touch panel 220, according to the detection signal outputted from the touch panel 220.

The user's operation includes a flick operation, a tap operation, and a pinch operation. For example, when the user places the finger on the touch panel 220 and then slides the finger maintaining the contact therewith, the touch panel 220 outputs a detection signal indicating the points where the finger has passed between the initial position where the contact has been detected first and the final position where the contact has been detected last, to the operation reception unit 203. Upon receipt the detection signal from the touch panel 220, the operation reception unit 203 identifies that the operation inputted by the user is the flick operation. The operation reception unit 203 then outputs a control signal corresponding to the flick operation to the display controller 202 and the instruction generation unit 204.

The instruction generation unit 204 is configured to generate the image forming instruction directed to the image forming apparatus 10, according to the user's operation such as the flick operation received by the operation reception unit 203.

The communication controller 205 is configured to control the communication unit 240 so as to transmit and receive data to and from the image forming apparatus 10. For example, the communication controller 205 causes the communication unit 240 to transmit the image forming instruction generated by the instruction generation unit 204 to the image forming apparatus 10.

Hereunder, the operation of the mobile terminal device 20 and the image forming apparatus 10 configured as above will now be described. FIG. 4 is a flowchart showing an operation of the mobile terminal device 20 and the image forming apparatus 10.

When the operation reception unit 203 receives, through the user's operation performed on the touch panel 220, the instruction to display the print instruction screen (YES at step S10), the display controller 202 causes the display unit 210 to display the print instruction screen (step S11).

When the operation reception unit 203 receives a flick operation performed on the data icon shown in the print instruction screen after the print instruction screen is displayed (YES at step S12), the instruction generation unit 204 executes the process of step S13.

Figure 5A:
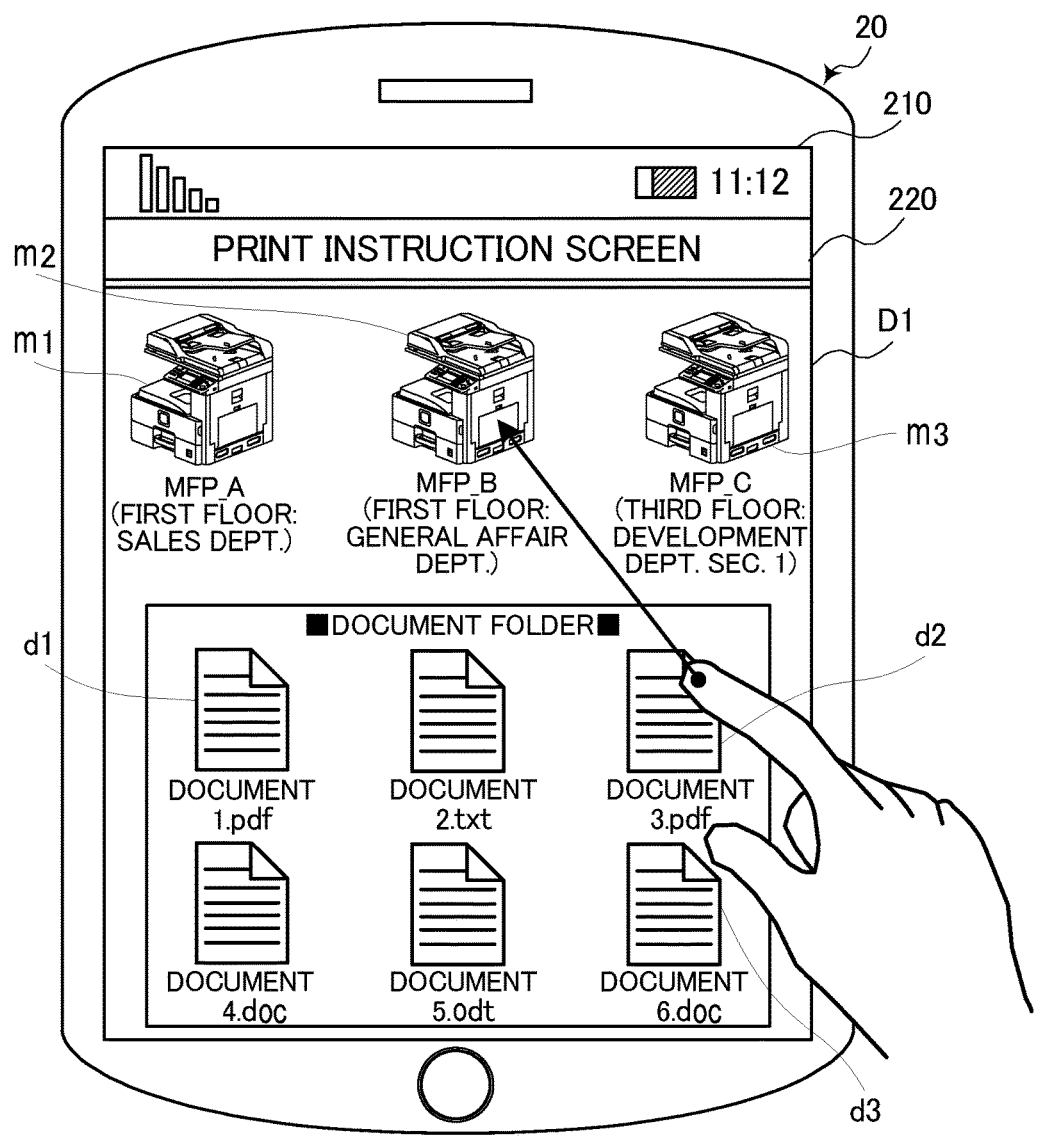
FIG. 5A and FIG. 5B are schematic drawings each showing an example of the print instruction screen displayed on the display unit of the mobile terminal device according to the embodiment of the disclosure.

At step S13, the instruction generation unit 204 identifies, as the data of the image to be formed, the data represented by the data icon on which the flick operation has been performed, out of the plurality of data icons arranged on the print instruction screen D1. In the example shown in FIG. 5A, the instruction generation unit 204 identifies data of "DOCUMENT 3.pdf" represented by the data icon d2 as the data of the image to be formed. The instruction generation unit 204 also identifies the image forming apparatus 10 represented by the apparatus icon located along the direction of the flick operation, out of the plurality of apparatus icons arranged on the print instruction screen D1, as the image forming apparatus to be used for the image forming based on the data of the image to be formed. In the example shown in FIG. 5A, the instruction generation unit 204 identifies "MFP_B" represented by the apparatus icon m2 as the image forming apparatus to be used for the image forming.

After step S13, the communication controller 205 causes the communication unit 240 to transmit, to the image forming apparatus 10 identified at step S13, a request for setting information, in other words an instruction to provide the setting information including a list of the items to be set related to the image forming that can be set in the image forming apparatus 10, and the default set values of the items to be set in the image forming apparatus 10. The communication controller 205 also causes the communication unit 240 to transmit the data of the image to be formed identified at step S13, to the image forming apparatus 10 identified as above (step S14). Further, the communication controller 205 causes the communication unit 240 to transmit a request for a preview image showing an image supposed to be formed from the data of the image to be formed on the basis of the default set values, in addition to the setting information.

When the communication unit 170 of the image forming apparatus 10 receives the request for the setting information, and the document that is the object of image forming transmitted at step S14 (step S30), the controller 101 of the image forming apparatus 10 looks up the settings stored in the storage unit 160 and generates the setting information (step S31). The controller 101 also generates the preview image, showing the image supposed to be formed on the basis of the default set values from the data of the image to be formed received at step S30 (step S32). Then the communication controller 105 of the image forming apparatus 10 transmits the setting information and the preview image generated at step S32 to the mobile terminal device 20 (step S33).

The communication controller 205 of the mobile terminal device 20 may decide, before proceeding to step S14, whether it is possible to make communication with the image forming apparatus 10 identified at step S13. For example, the communication controller 205 may cause the communication unit 240 to transmit a signal for requesting the authentication of the mobile terminal device 20, to the image forming apparatus 10. Upon receipt of such a signal, the image forming apparatus 10 authenticates the mobile terminal device 20 using the authentication unit 104. When the mobile terminal device 20 is authenticated, the communication controller 105 of the image forming apparatus 10 transmits a signal indicating that the communication has been established, to the mobile terminal device 20. The communication controller 205 of the mobile terminal device 20 decides, upon receipt of such a signal, that the communication can be made with the image forming apparatus 10.

Figure 5B:
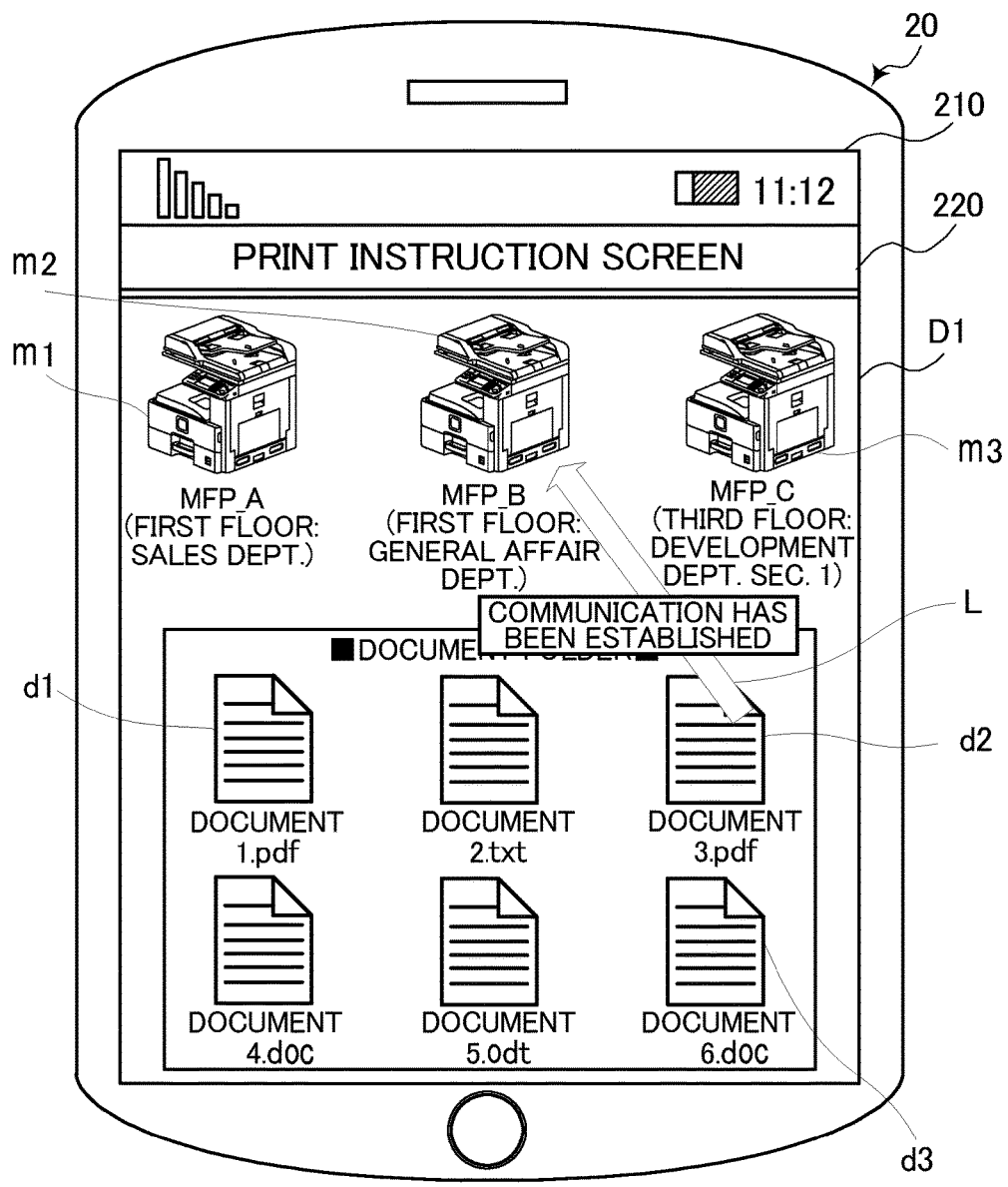

When the communication controller 205 decides that the communication can be made with the image forming apparatus 10 identified at step S13, the display controller 202 causes the display unit 210 to display an image indicating that the communication with the image forming apparatus 10 has been established, in the print instruction screen D1. In the example shown in FIG. 5B, an arrow image L, drawn between the data icon d2 representing "DOCUMENT 3.pdf" which is the data of the image to be formed and the apparatus icon m2 representing the image forming apparatus "MFP_B" identified as the image forming apparatus to be used for the image forming, is displayed in the print instruction screen D1. In view of the arrow image L, the user can recognize that the communication has been established between the user's mobile terminal device and the image forming apparatus "MFP_B".

When the communication unit 240 of the mobile terminal device 20 receives the setting information and the preview image transmitted at step S33 (step S15), the display controller 202 causes the display unit 210 to display the setting screen. The setting screen is used for inputting changes from the default set values indicated by the setting information, with respect to the items to be set indicated by the setting information.

Figure 6:
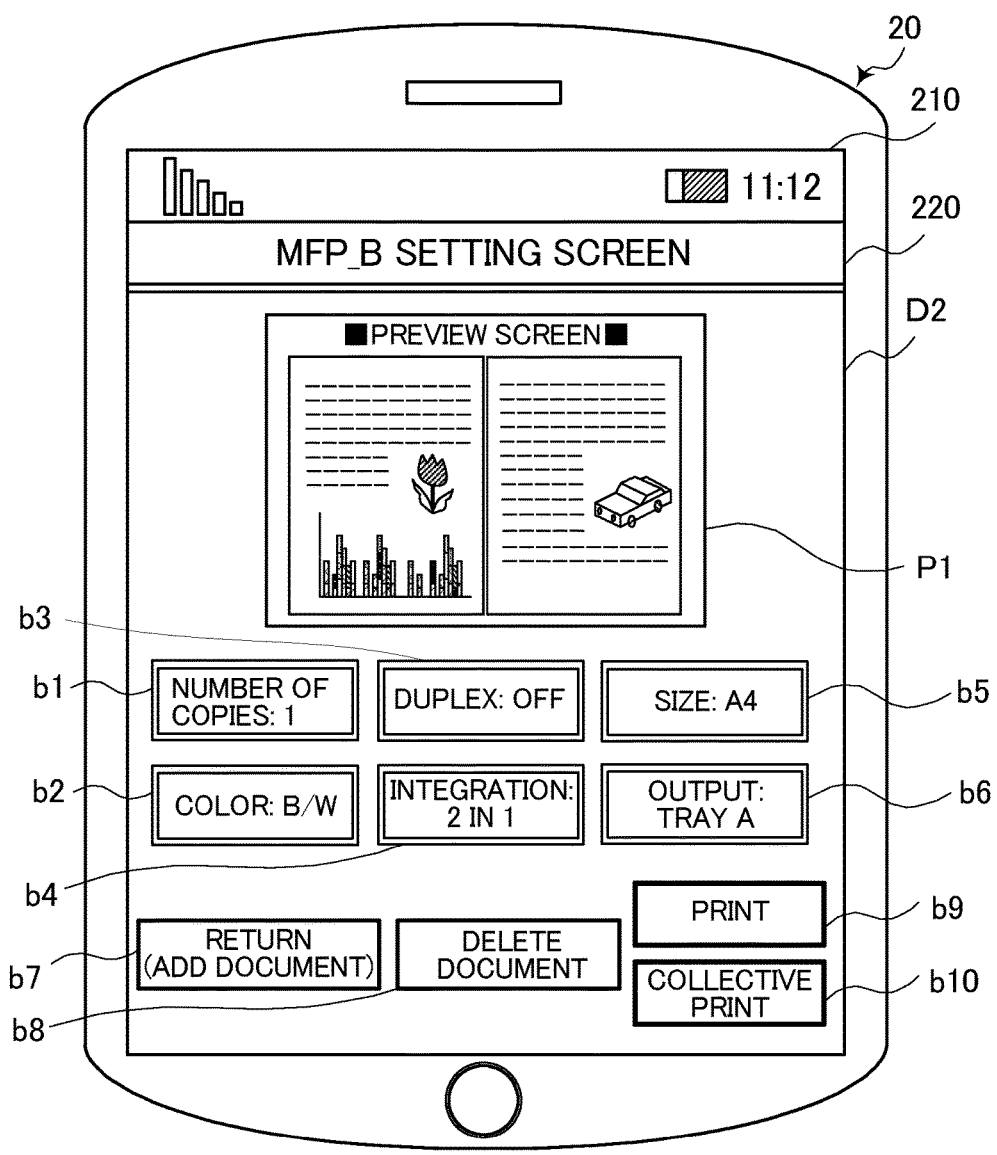
FIG. 6 is a schematic drawing showing an example of a setting screen displayed on the display unit of the mobile terminal device according to the embodiment of the disclosure.

FIG. 6 is a schematic drawing showing an example of the setting screen displayed on the display unit 210. As shown in FIG. 6, the setting screen D2 includes a preview screen P1 displaying the preview image, and buttons b1 to b6 representing the items that can be set in the image forming apparatus 10 indicated by the setting information. The buttons b1 to b6 each show the default set value indicated by the setting information. For example, the button b4 shows the default set value indicating that the image is to be formed in a format of "2 in 1".

The setting screen D2 also includes a button b7 for transition (returning) from the setting screen D2 to the print instruction screen D1, a deletion button b8 for deleting the data of the image to be formed, a print execution button b9 for inputting an instruction to execute the printing, and a collective print execution button b10 for inputting an instruction to execute the printing of all the images, when a plurality of items of data of image to be formed are prepared.

Referring back to FIG. 4, when the operation reception unit 203 receives an instruction to change the set value through the setting screen D2 (YES at step S17), the instruction generation unit 204 changes the set value of the item to be set from the default value, according to the user's operation received by the operation reception unit 203 (step S18). In the example shown in FIG. 6, for example when the user wishes, in view of the preview image displayed in the preview screen P1, to form the image in equal magnification instead of "2 in 1", the user presses the button b4 so as to change the set value to "equal magnification" from "2 in 1" which is the default set value. When the operation reception unit 203 receives such operation, the instruction generation unit 204 changes the set value of the item of "page integration" to "equal magnification" from "2 in 1".

After step S18, the display controller 202 changes the preview image shown in the preview screen P1 to a preview image supposed to be formed on the basis of the changed set value from the data of the image to be formed (step S19). At step S19, alternatively, the changed set value may be transmitted to the image forming apparatus 10, so that the image forming apparatus 10 may generate the preview image based on the changed set value.

When the operation reception unit 203 receives the print execution instruction after step S19 (YES at step S21), the instruction generation unit 204 generates an image forming instruction to form the image on the basis of the set value of the item to be set determined at step S18, from the data of the image to be formed (step S22). Then the communication controller 205 causes the communication unit 240 to transmit the image forming instruction generated by the instruction generation unit 204 to the image forming apparatus. Here, at step S22 the instruction generation unit 204 may only include the set value(s) of the item(s) to be set changed from the default set value in the image forming instruction, instead of including all the set values of the items to be set, and exclude the set value(s) of the item(s) to be set unchanged from the default set value from the image forming instruction.

When the communication unit 170 of the image forming apparatus 10 receives the image forming instruction transmitted at step S22 (step S34), the controller 101 of the image forming apparatus 10 causes the image forming unit 120 to form the image based on the data of the image to be formed, according to the image forming instruction (step S35). The communication controller 105 of the image forming apparatus 10 then causes the communication unit 170 to transmit a notice to the effect that the image forming has been completed (step S36).

When the communication unit 240 of the mobile terminal device 20 receives the notice to the effect that the image forming has been completed (step S23), the display controller 202 causes the display unit 210 to display a notification screen indicating that the image forming has been completed (step S24).

In general, with the spread of the display and input devices, such cases are increasing that data in the image forming apparatus is designated by the display and input device, not only by a personal computer (PC), to cause the image forming apparatus to form an image based on the designated data. The technique described in the section of Background may be applied to the case of causing the image forming apparatus to form an image through the display and input device. More specifically, the image forming apparatus designated through a flick operation, performed on an icon representing data, may be caused to form an image based on the data.

In the aforementioned case, however, the set value of the item to be set is unable to be changed to a desired value, despite that the image forming apparatus is configured to accept the setting of various items to be set, such as a paper size, for the image forming process. In addition, the items that can be set may differ depending on the type of the image forming apparatus, and therefore it is impossible to uniformly change the set value of the items to be set.

In contrast, the mobile terminal device 20 according to this embodiment enables transmission of the image forming instruction including the set value(s) changed to the desired value(s) with respect to the items that can be set in the image forming apparatus, through an intuitive and simple user's operation.

The disclosure is not limited to the foregoing embodiment, but may be modified in various manners.

Variation 1

The foregoing embodiment refers to the case where an image is formed on the basis of the data represented by one of the plurality of data icons arranged on the print instruction screen D1. With a mobile terminal device according to a variation 1, the image is formed on the basis of the data represented by two or more data icons.

More specifically, when the operation reception unit 203 receives a selecting operation of two or more data icons on the print instruction screen D1, and then receives flick operations performed on the same two or more data icons, the instruction generation unit 204 identifies the data represented by the mentioned two or more data icons as the data of the image to be formed. Then the communication controller 205 transmits the plurality of items of data to the image forming apparatus 10 as the data of the image to be formed, to thereby cause the image forming apparatus 10 to form the image.

Thus, the mobile terminal device according to the variation 1 enables formation of an image based on a plurality of items of data through an intuitive and simple operation, in addition to the setting of the values of the items to be set.

Variation 2

Figure 7:
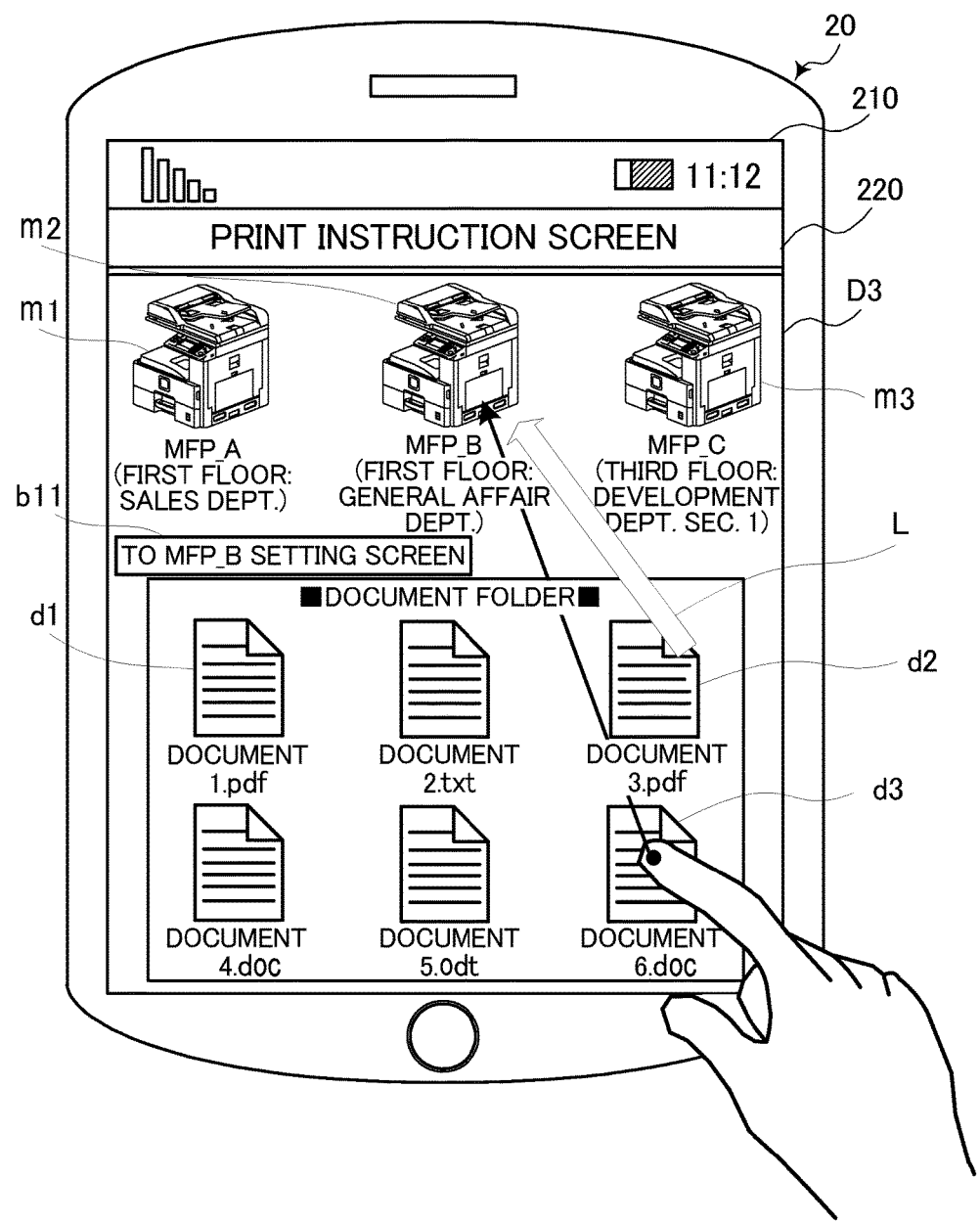
FIG. 7 is a schematic drawing showing an example of a print instruction screen displayed on a display unit of a mobile terminal device according to a variation 2.

When the operation reception unit 203 receives a pressing operation of the button b7 on the setting screen D2, the display controller 202 shifts the screen to be displayed by the display unit 210 from the setting screen to the print instruction screen. FIG. 7 illustrates an example of the print instruction screen displayed after the transition. The print instruction screen D3 displayed after the transition includes, in addition to the print instruction screen D1 before the transition, a button b11 for transition (returning) from the print instruction screen D3 to the setting screen D2.

When the operation reception unit 203 receives the flick operation performed on one of the plurality of data icons in the print instruction screen D3 displayed after the transition, the instruction generation unit 204 identifies the data represented by the data icon as the data of the image to be formed, in addition to the data already identified as the data of the image to be formed, in the case where the apparatus icon located along the direction of the flick operation represents the image forming apparatus already identified as the image forming apparatus to be used for the image forming.

Figure 8:
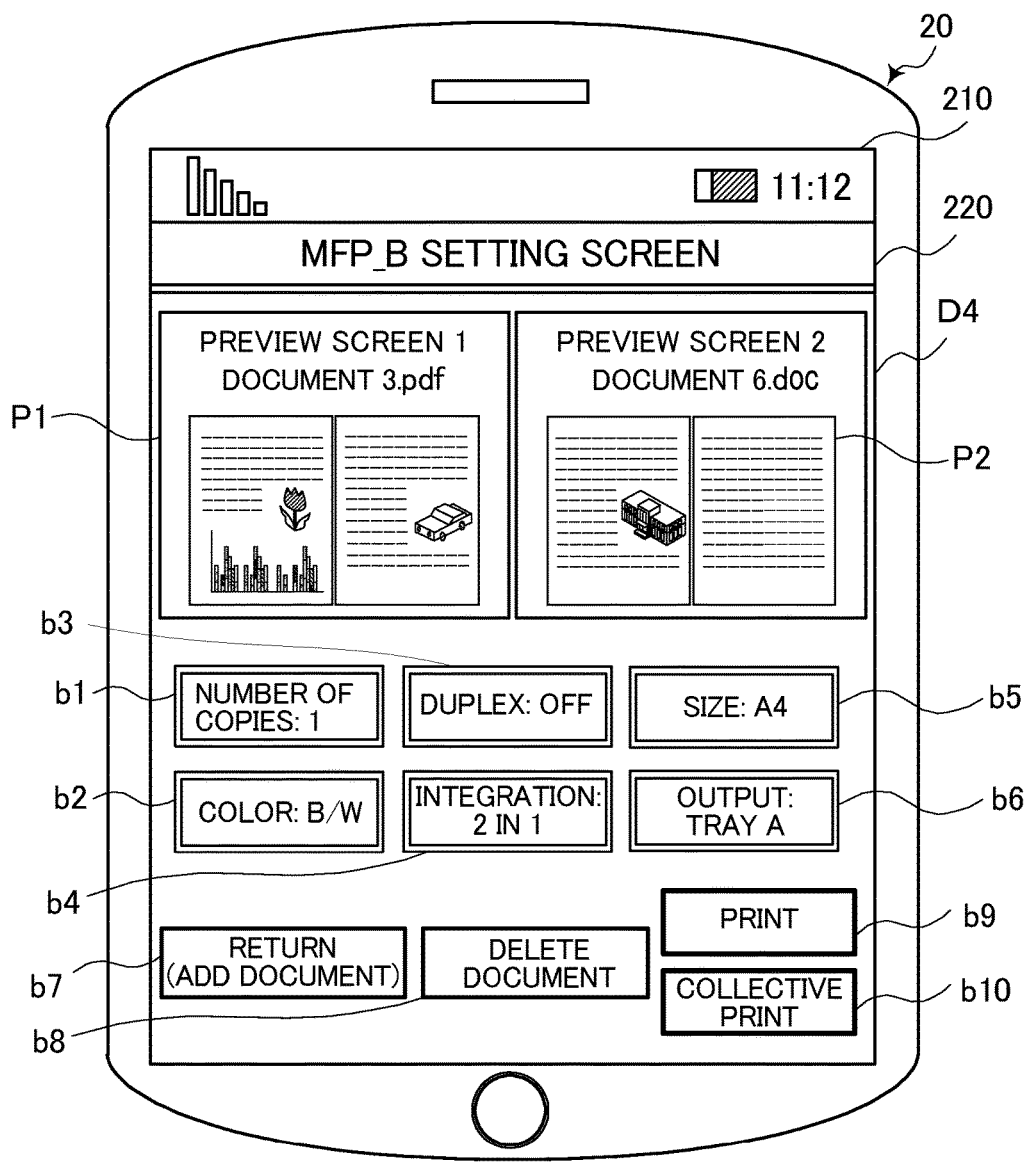
FIG. 8 is a schematic drawing showing an example of a setting screen displayed on the display unit of the mobile terminal device according to the variation 2.

Then the display controller 202 causes the display unit 210 to shift the screen from the print instruction screen D3 to the setting screen. FIG. 8 illustrates an example of the print instruction screen displayed at this point. The setting screen D4 includes a plurality of preview screens P1, P2, so as to display the preview images representing a plurality of items of data to be formed into the image.

Thus, a mobile terminal device according to the variation 2 enables, like the mobile terminal device according to the variation 1, formation of an image based on a plurality of items of data through an intuitive and simple operation, in addition to the setting of the values of the items to be set.

Variation 3

In a mobile terminal device according to a variation 3, when a flick operation is performed in a direction toward a position between two of the plurality of apparatus icons arranged on the print instruction screen D1, one of the two image forming apparatuses respectively represented by the two apparatus icons is caused to form the image.

Figure 9A:
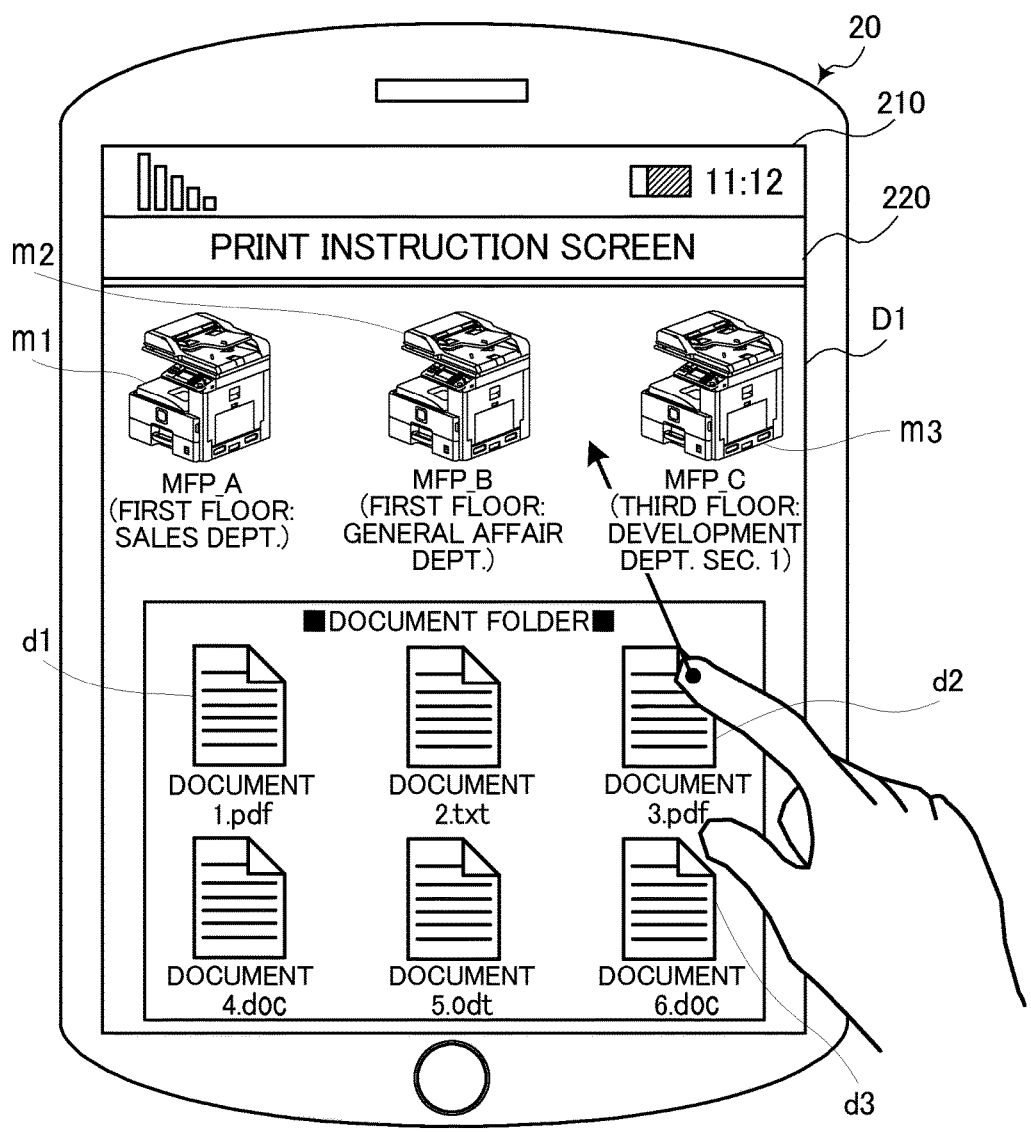
FIG. 9A and FIG. 9B are schematic drawings each showing an example of a print instruction screen displayed on a display unit of a mobile terminal device according to a variation 3.
Figure 9B:
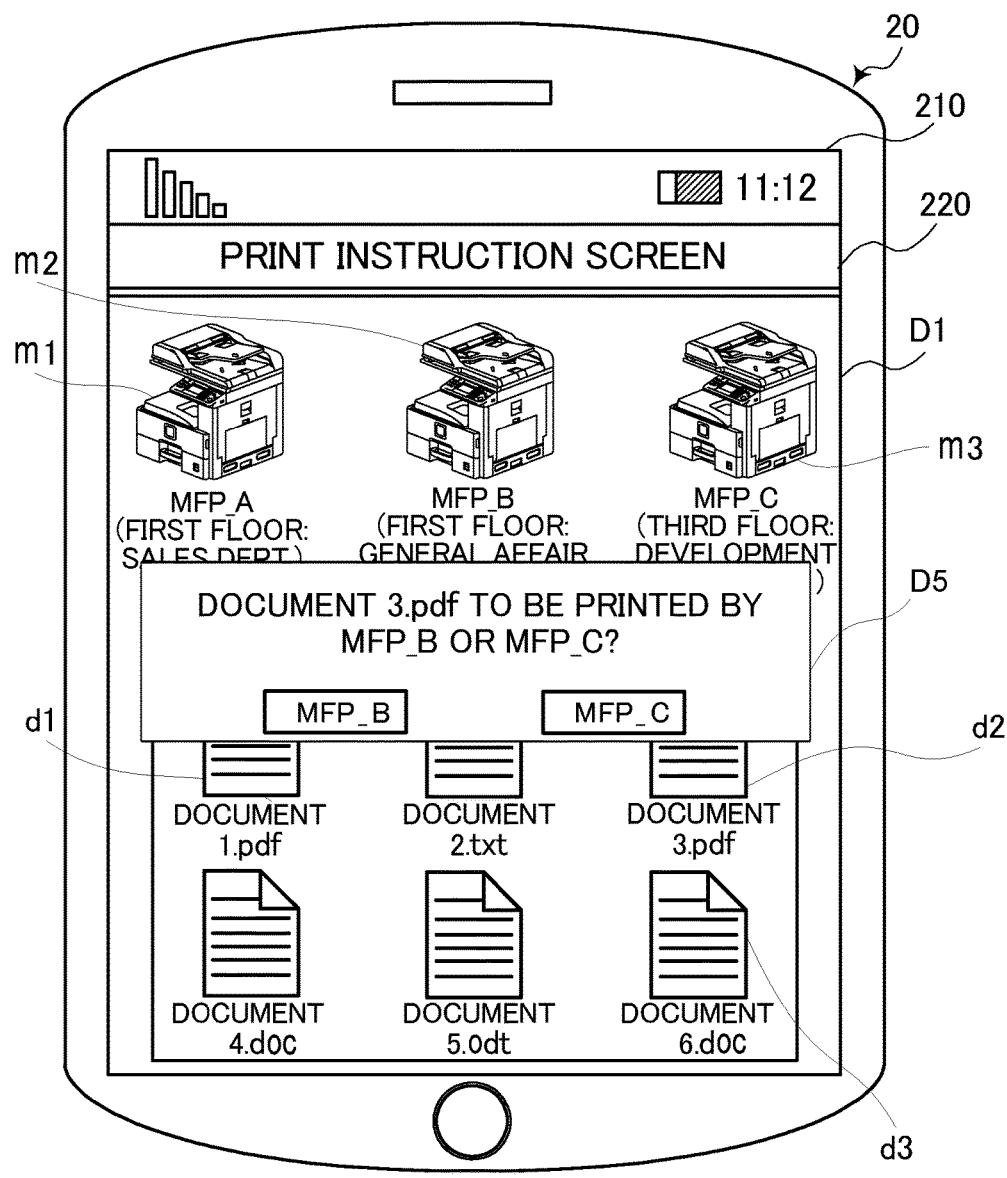

In the example shown in FIG. 9A, the flick operation is performed from the position of the data icon d2 toward a position between the apparatus icon m2 and the apparatus icon m3. In this case, the display controller 202 causes the display unit 220 to display a reception screen D5 for determining which of the image forming apparatus 10 represented by "MFP_B" corresponding to the apparatus icon m2 and the image forming apparatus 10 represented by "MFP_C" corresponding to the apparatus icon m3 is to form the image (see FIG. 9B).

Then the instruction generation unit 204 identifies the image forming apparatus selected by a press of a select button shown in the reception screen D5, as the image forming apparatus 10 to be used for the image forming.

Thus, with the mobile terminal device according to the variation 3, the image forming apparatus designated by the user can be set to form the image, even when the flick operation is performed in a direction toward a position between two of the plurality of apparatus icons.

Variation 4

In a mobile terminal device according to a variation 4, when a flick operation is performed in a direction toward a position between two of the plurality of apparatus icons arranged on the print instruction screen D1, the instruction generation unit 204 identifies the two image forming apparatuses respectively represented by the two apparatus icons as the image forming apparatuses to be used for the image forming. More specifically, when the flick operation is performed as shown in FIG. 9A, the instruction generation unit 204 identifies the image forming apparatus 10 represented by "MFP_B" and the image forming apparatus 10 represented by "MFP_C", as the image forming apparatuses to be used for the image forming.

Further, the reception screen D5 displayed by the display unit 220 of the mobile terminal device according to the variation 3 (see FIG. 9B) may include a button for instructing both of the two image forming apparatuses to form the image. When the operation reception unit 203 receives a pressing operation of such a button, the instruction generation unit 204 identifies the image forming apparatus 10 represented by "MFP_B" and the image forming apparatus 10 represented by "MFP_C", as the image forming apparatuses to be used for the image forming.

Other Variations

Although the display and input device is exemplified by the mobile terminal device in the foregoing embodiment and variations, the disclosure is applicable to various other devices. The display and input device according to the embodiment of the disclosure is applicable, for example, to an image forming apparatus, a personal computer, and a TV set, other than the mobile terminal device.

While the present disclosure has been described in detail with reference to the embodiments thereof, it would be apparent to those skilled in the art the various changes and modifications may be made therein within the scope defined by the appended claims.

What is claimed is:

1. A display and input device comprising:
    a display unit;
    a touch panel located on a front face of the display unit;
    a communication unit configured to transmit and receive data to and from a plurality of image forming apparatuses provided outside; and
    a control unit that includes a processor and, based on operation of the processor in accordance with a display and input control program, performs as:
    a display controller that controls a displaying operation performed by the display unit;

an operation reception unit that receives a user's operation performed on the touch panel;

a communication controller that controls a communicating operation performed by the communication unit; and an instruction generation unit that generates an image forming instruction directed to an image forming apparatus, according to the user's operation received by the operation reception unit, wherein the instruction generation unit identifies data of an image to be formed, and one of the plurality of image forming apparatuses to be used for image forming based on the data of the image to be formed, according to the user's operation received by the operation reception unit, the communication controller causes the communication unit to transmit, to the image forming apparatus identified by the instruction generation unit, an instruction to provide setting information including a list of items to be set related to an image forming operation that can be set in the image forming apparatus and default set values of the respective items to be set in the image forming apparatus, the display controller causes the display unit, when the communication unit receives the setting information from the image forming apparatus, to display a setting screen for inputting a change of the set value from the default set value indicated in the setting information, with respect to the item to be set the setting information, the instruction generation unit determines the set value of the item to be set according to the user's operation received by the operation reception unit through the setting screen, and generates the image forming instruction to form the image based on the data of the image to be formed, according to the determined set value of the item to be set, the communication controller causes the communication unit to transmit the image forming instruction generated by the instruction generation unit to the image forming apparatus, the display controller further causes the display unit to display a reception screen including a plurality of data icons respectively representing a plurality of items of data, and a plurality of apparatus icons respectively representing the plurality of image forming apparatuses, the instruction generation unit identifies, when the operation reception unit receives a flick operation performed on one of the plurality of data icons, the data represented by the data icon as the data of image to be formed, and identifies the image forming apparatus represented by one of the plurality of apparatus icons located along a direction of the flick operation, as an image forming apparatus to be used for the image forming based on the data of image to be formed, the display controller further causes the display unit to display, when a flick operation performed in a direction toward a position between two of the plurality of apparatus icons is received by the operation reception unit, a reception screen for determining which of the two image forming apparatuses is to form the image, and the instruction generation unit identifies one of the two image forming apparatuses selected according to a user's operation received by the operation reception unit through the reception screen, as the image forming apparatus to be used for the image forming.

2. A display and input device comprising:

a display unit;

a touch panel located on a front face of the display unit;

a communication unit configured to transmit and receive data to and from a plurality of image forming apparatuses provided outside; and a control unit that includes a processor and, based on operation of the processor in accordance with a display and input control program, performs as:

a display controller that controls a displaying operation performed by the display unit;

an operation reception unit that receives a user's operation performed on the touch panel;

a communication controller that controls a communicating operation performed by the communication unit; and an instruction generation unit that generates an image forming instruction directed to an image forming apparatus, according to the user's operation received by the operation reception unit, wherein the instruction generation unit identifies data of an image to be formed, and one of the plurality of image forming apparatuses to be used for image forming based on the data of the image to be formed, according to the user's operation received by the operation reception unit, the communication controller causes the communication unit to transmit, to the image forming apparatus identified by the instruction generation unit, an instruction to provide setting information including a list of items to be set related to an image forming operation that can be set in the image forming apparatus and default set values of the respective items to be set in the image forming apparatus, the display controller causes the display unit, when the communication unit receives the setting information from the image forming apparatus, to display a setting screen for inputting a change of the set value from the default set value indicated in the setting information, with respect to the item to be set the setting information, the instruction generation unit determines the set value of the item to be set according to the user's operation received by the operation reception unit through the setting screen, and generates the image forming instruction to form the image based on the data of the image to be formed, according to the determined set value of the item to be set, the communication controller causes the communication unit to transmit the image forming instruction generated by the instruction generation unit to the image forming apparatus, the display controller further causes the display unit to display a reception screen including a plurality of data icons respectively representing a plurality of items of data, and a plurality of apparatus icons respectively representing the plurality of image forming apparatuses, the instruction generation unit identifies, when the operation reception unit receives a flick operation performed on one of the plurality of data icons, the data represented by the data icon as the data of image to be formed, and identifies the image forming apparatus represented by one of the plurality of apparatus icons located along a direction of the flick operation, as an image forming apparatus to be used for the image forming based on the data of image to be formed, and the instruction generation unit further identifies, when a flick operation performed in a direction toward a position between two of the plurality of apparatus icons is received by the operation reception unit, two image forming apparatuses respectively represented by the two apparatus icons as the image forming apparatuses to be used for the image forming.

\* \* \* \* \*